O. F. SCOTT.
STALK CUTTER.
APPLICATION FILED MAY 9, 1911.
1,002,605.
Patented Sept. 5, 1911.
2 SHEETS—SHEET 1.
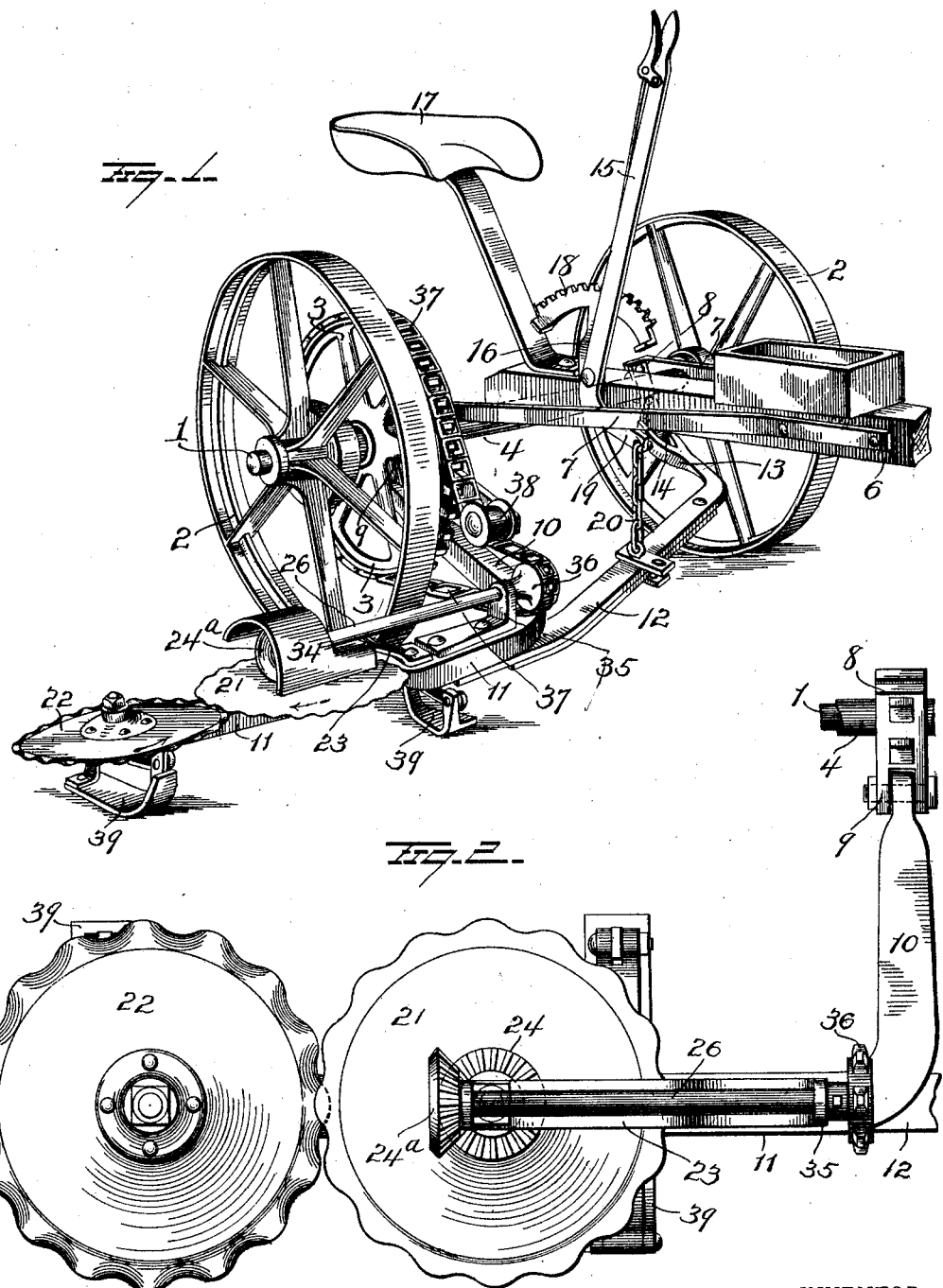
WITNESSES
INVENTOR
O. F. Scott.
By H. A. Seymour
Attorneys

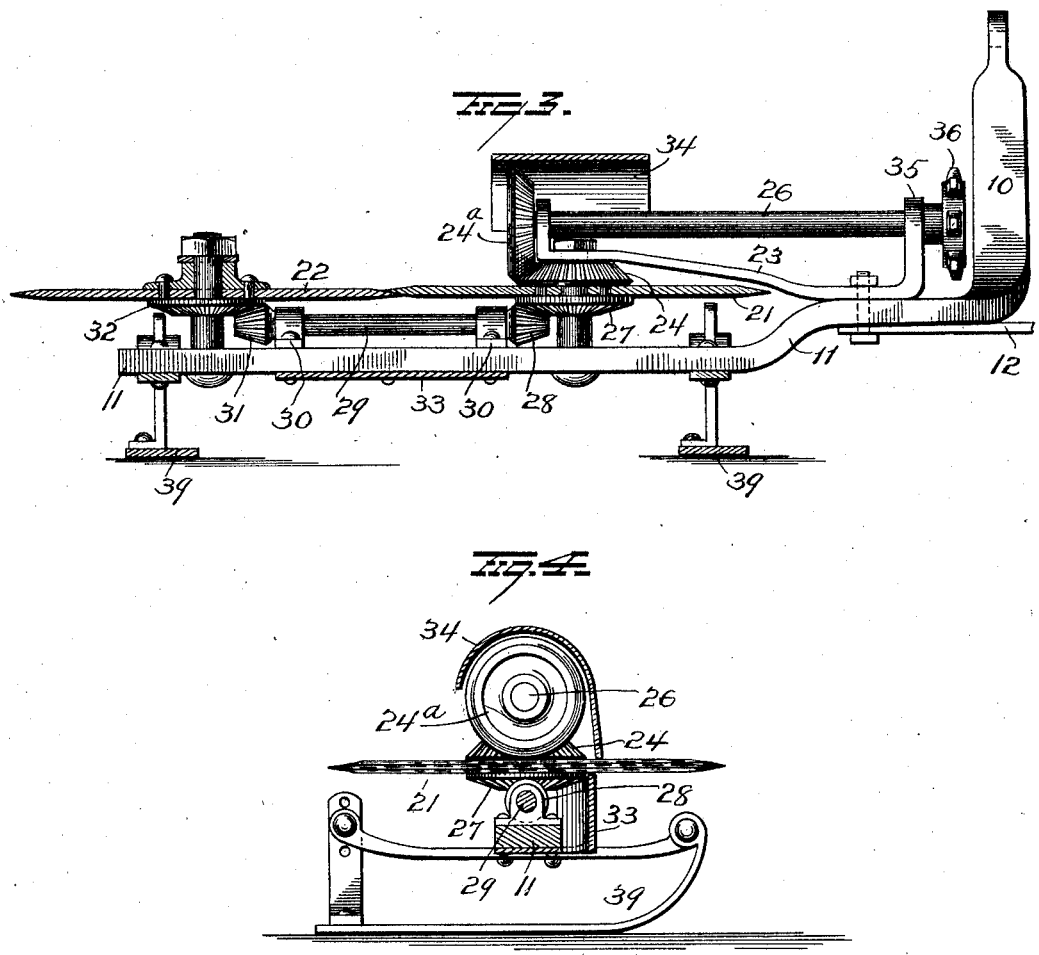

UNITED STATES PATENT OFFICE.

OSCAR F. SCOTT, OF GAINESVILLE, TEXAS.

STALK-CUTTER.

1,002,605.	Specification of Letters Patent.	Patented Sept. 5, 1911.

Application filed May 9, 1911. Serial No. 626,107.

*To all whom it may concern:*

Be it known that I, OSCAR F. SCOTT, of Gainesville, in the county of Cooke and State of Texas, have invented certain new and useful Improvements in Stalk-Cutters; and I do hereby declare the following to be a full, clear, and exact description of the invention, such as will enable others skilled in the art to which it appertains to make and use the same.

This invention relates to improvements in stalk cutters,—the object of the invention being to provide a machine which shall be substantial in construction and capable of cutting heavy and tough cotton stalks and which shall also be efficient in operation to cut corn stalks, cane and brush.

A further object is to so construct the machine that it can be employed for cutting cotton stalks located between sections or rows of growing wheat or other grain without injuring such grain.

With these and other objects in view, the invention consists in certain novel features of construction and combinations of parts as hereinafter set forth and pointed out in the claims.

In the accompanying drawings:—Figure 1 is a perspective view of a machine embodying my improvements. Fig. 2 is a plan view showing the cutting devices; Fig. 3 is a longitudinal section of the structure shown in Fig. 2, and Fig. 4 is a cross section of the same.

1 represents an axle having its journals mounted in traction wheels 2 and adjacent to one of said traction wheels a sprocket wheel 3 is secured to the axle. A tube 4 is located on the axle between one of the traction wheels and said sprocket wheel and suitable ball bearings may be provided between the ends of this tube and the adjacent wheels and between the sprocket wheel and the adjacent traction wheel. The rear end of a tongue 6 is secured to the tube 4 and braces 7 are secured at their forward ends to the tongue and at their rear ends to brackets 8 secured to the tube 4. One of the brackets 8 is provided with a depending arm 9 to which one end of an L-shaped bar 10 is pivotally connected. The bar 10 extends forwardly from its pivotal connection with the arm 9 and then laterally in front of and laterally beyond one of the traction wheels and constitutes a cutter bar member 11. Near the juncture of the members 10—11 of the L-shaped bar, a bar 12 is rigidly secured and provided at its far end with a rearwardly projecting arm 13 which is pivotally connected with an arm 14 depending from the bracket 8 which is adjacent to the traction wheel farthest removed from the sprocket wheel 3. The bars 10—11 and 12 constitute a frame on which the cutting mechanism is mounted, as presently explained, and this frame is vertically movable for the purpose of raising or lowering said cutting mechanism. For the purpose of raising or lowering said frame, a lever 15 is provided. This lever is pivotally supported by a standard 16 secured to the rear portion of the tongue and in position to be reached by an operator on a seat 17 also supported on the rear end of the tongue. The lever 15 is provided with a suitable detent to engage a notched segment 18 supported by the standard 16. The lower end of the lever 15 is provided with a forwardly projecting arm 19, to which the upper end of a chain 20 is attached,—the lower end of said chain being secured to the bar 12 so that when the lever 15 is operated the frame carrying the cutting mechanism can be readily raised or lowered or locked in any desired position by the engagement of the detent on the lever 15 with the toothed segment 18.

The cutter bar member 11 carries two cutting disks 21—22 which are of sufficient size and strength to cut heavy and tough stalks. Suitable bearings for these cutting disks are provided in the cutter bar member 11 and these bearings are so located relatively to each other that when the cutting disks are in position their peripheral portions will overlap as shown in Fig. 1. In order to increase the efficiency of the disks in cutting stout and tough stalks, said disks may be made with crenelated peripheries and the peripheral cutter portions of said disks are beveled,—one disk being crenelated on the opposite face from that on which the crenels of the other disk are made.

The shaft to which the disk 21 is secured has a bearing, not only in the cutter-bar member 11 but also in a bracket 23 secured upon said cutter-bar member and projecting partially over the cutting disk 21. The shaft of the cutting disk 21 has secured thereto between the bracket 23 and said cutting disk, a beveled pinion 24 to which motion is imparted from a beveled pinion 24ª secured to a shaft 26 mounted at one end in the bracket 23. The shafts of the cutting disks may be made tubular and mounted on rigid studs projecting from the cutter-bar member 11. A beveled pinion 27 is located under the cutting disk 21 and is secured to the latter or to the shaft of said disk and transmits motion to a beveled pinion 28 on one end of a counter shaft 29. This counter shaft is mounted in brackets 30 secured to the member 11 and at its other end, it has secured thereto a beveled pinion 31 which imparts motion to a beveled pinion 32 secured to the under face of the cutting disk 22 or to the shaft which rotates with said cutting disk. For the purpose of protecting the gearing under the cutting disk, a guard 33 is provided, said guard being secured to the member 11. For the purpose of protecting the gears over the cutter disk 21, a guard 34 is provided and secured to the bracket 23.

The shaft 26 above referred to has a bearing near its inner end in a bracket 35 rising from the cutter bar member 11 near the juncture of said member with the member 10. The shaft 26 projects somewhat beyond its bearing in the bracket 35 and has secured to its free end, a sprocket wheel 36 which receives motion, by means of a sprocket chain 37 from the large sprocket wheel 3 on the axle. A suitable tightener 38 may be provided for keeping the sprocket chain tight.

For the purpose of supporting the frame of the cutting mechanism on the ground and permitting the same to readily move over the ground, shoes or runners 39 are secured to the cutter-bar member 11.

My improved machine is of substantial construction and capable of cutting stout and tough stalks as well as persimmon and pecan sprouts and other tough growths without strain or injury to any of the parts of the machine.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. In a machine of the character described, the combination with a wheeled frame, of a laterally projecting frame supported by the wheeled frame, overlapping cutting disks mounted on said laterally projecting frame, two beveled pinions rotatable with one of said cutting disks, a shaft provided with a pinion meshing with one of the pinions on said cutting disk, a counter shaft supported by the laterally projecting frame, pinions carried by said counter shaft and meshing with the second of said pinions on one disk and with the pinion on the other disk, and means for transmitting motion to the first mentioned shaft.

2. In a machine of the character described, the combination with a wheeled frame, of an L-shaped bar supported by said frame and projecting laterally therefrom, overlapping cutting disks mounted on the laterally projecting portion of said bar, gearing connecting said cutting disks under the same, a shaft mounted upon said bar, gearing connecting said shaft with one of the cutting disks over the same, and gearing between said shaft and axle of the machine.

3. In a machine of the character described, the combination with a wheeled frame and arms depending therefrom, of an L-shaped bar pivotally connected with one of said arms and projecting laterally from the wheel frame, a bar rigidly secured to said L-shaped bar and pivotally connected with the other depending arm of the wheeled frame, a hand lever mounted on the wheeled frame, a connection between said hand lever and the last mentioned pivoted bar, cutting disks mounted on the L-shaped bar, gearing connecting said cutting disks, and gearing between one of said cutting disks and the axle of the wheeled frame.

4. In a machine of the character described, the combination with a traveling frame, and a bar projecting laterally therefrom, of two cutting disks having overlapping peripheral portions, mounted over said bar and supported thereby, means for transmitting motion to one of said disks, pinions disposed under and secured to said disks, a shaft supported by said bar and disposed under the cutting disks, and pinions secured to said shaft and meshing with the pinions under the cutting disks.

In testimony whereof, I have signed this specification in the presence of two subscribing witnesses.

OSCAR F. SCOTT.

Witnesses:
A. W. SMITH,
F. MORRIS, Jr.

Copies of this patent may be obtained for five cents each, by addressing the "Commissioner of Patents, Washington, D. C."